(12) United States Patent
Yoon et al.

(10) Patent No.: US 9,405,049 B2
(45) Date of Patent: Aug. 2, 2016

(54) POLARIZING PLATE AND LIQUID CRYSTAL DISPLAY COMPRISING THE SAME

(75) Inventors: Sung Soo Yoon, Daejeon (KR); Ki Ok Kwon, Daejeon (KR); No Ma Kim, Daejeon (KR); In Ho Hwang, Daejeon (KR); Sung Hyun Nam, Daejeon (KR); In Kyu Park, Daejeon (KR); Kyun Il Rah, Daejeon (KR); Min Ki Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 71 days.

(21) Appl. No.: 13/580,605

(22) PCT Filed: Feb. 28, 2011

(86) PCT No.: PCT/KR2011/001403
§ 371 (c)(1),
(2), (4) Date: Aug. 22, 2012

(87) PCT Pub. No.: WO2011/105875
PCT Pub. Date: Jan. 9, 2011

(65) Prior Publication Data
US 2012/0320317 A1    Dec. 20, 2012

(30) Foreign Application Priority Data

Feb. 26, 2010 (KR) .................. 10-2010-0017668
Feb. 28, 2011 (KR) .................. 10-2011-0018052

(51) Int. Cl.
*G02F 1/1335*  (2006.01)
*G02B 5/30*   (2006.01)
(Continued)

(52) U.S. Cl.
CPC ........... *G02B 5/305* (2013.01); *B32B 2457/202* (2013.01); *C09J 133/08* (2013.01);
(Continued)

(58) Field of Classification Search
CPC ........ G02B 5/00; G02B 5/3041; G02B 5/305; G02F 2202/28; G02F 1/133528; C09J 7/00; C09J 2201/606; C09J 133/08; C09J 133/10; C09J 2201/36; C09J 2201/40; C09J 2201/60; C09J 2203/318; C09J 2433/00; B32B 27/06; B32B 27/08; B32B 27/16; B32B 27/28; B32B 27/308; B32B 2457/202; Y10T 428/1036; Y10T 428/1041; Y10T 428/105; Y10T 428/1059; Y10T 428/1077; Y10T 428/1082
USPC ............ 156/106, 247; 349/96–103, 122–138; 427/207.1, 208, 208.4, 208.6, 208.8; 428/1.1, 1.3, 1.5, 355 R, 355 EN, 428/355 BL, 355 AC, 356; 522/1–189; 524/236, 356, 555, 556; 525/329.9, 525/330.5; 526/931
See application file for complete search history.

(56) References Cited

U.S. PATENT DOCUMENTS

| | | | | |
|---|---|---|---|---|
| 6,074,729 A | * | 6/2000 | Watanabe et al. | ............ 428/212 |
| 2004/0191509 A1 | * | 9/2004 | Kishioka et al. | ............ 428/354 |

(Continued)

FOREIGN PATENT DOCUMENTS

| | | |
|---|---|---|
| CN | 101163768 A | 4/2008 |
| JP | 2002-014226 A | 1/2002 |

(Continued)

OTHER PUBLICATIONS

JP 2009-205141 A, Suzuki, English machine translation provided by http://dossier1.ipdl.inpit.go.jp/AIPN/odse_top_dn.ipdl?N0000=7400.*

(Continued)

*Primary Examiner* — Gwendolyn Blackwell
*Assistant Examiner* — Eli D Strah
(74) *Attorney, Agent, or Firm* — Dentons US LLP

(57) ABSTRACT

The present invention relates to a polarizing plate and a liquid crystal display device. The polarizing plate, which is lightweight and has a small thickness and excellent physical properties including durability, water resistance, workability, pressure-sensitive adhesion and a light leakage prevention effect; and the liquid crystal display device including the same may be provided.

8 Claims, 2 Drawing Sheets

(51) Int. Cl.
*C09J 133/08* (2006.01)
*C09J 133/10* (2006.01)

(52) U.S. Cl.
CPC ........... *C09J 133/10* (2013.01); *C09J 2201/36* (2013.01); *C09J 2201/40* (2013.01); *C09J 2201/60* (2013.01); *C09J 2201/606* (2013.01); *C09J 2203/318* (2013.01); *C09J 2433/00* (2013.01); *G02F 1/133528* (2013.01); *Y10T 428/105* (2015.01); *Y10T 428/1041* (2015.01); *Y10T 428/1059* (2015.01); *Y10T 428/1077* (2015.01); *Y10T 428/1082* (2015.01)

(56) References Cited

U.S. PATENT DOCUMENTS

| | | | |
|---|---|---|---|
| 2007/0267133 A1* | 11/2007 | Matano et al. | 156/272.2 |
| 2008/0220251 A1* | 9/2008 | Takaki | 428/345 |
| 2010/0143685 A1* | 6/2010 | Nakayama et al. | 428/220 |
| 2011/0149211 A1* | 6/2011 | Ha et al. | 349/96 |
| 2012/0314160 A1* | 12/2012 | Hwang et al. | 349/96 |
| 2012/0328800 A1* | 12/2012 | Yoon et al. | 428/1.55 |
| 2014/0160406 A1* | 6/2014 | Huh et al. | 349/96 |
| 2014/0178608 A1* | 6/2014 | Yoon et al. | 428/1.55 |

FOREIGN PATENT DOCUMENTS

| | | | | |
|---|---|---|---|---|
| JP | 2002014226 A * | 1/2002 | | G02B 5/30 |
| JP | 2003-177241 | 6/2003 | | |
| JP | 2003-177241 A | 6/2003 | | |
| JP | 2006-063189 | 3/2006 | | |
| JP | 2006-63189 | 3/2006 | | |
| JP | 2006-063189 A | 3/2006 | | |
| JP | 2006259622 A | 9/2006 | | |
| JP | 2006-299053 | 11/2006 | | |
| JP | 2008059836 A | 3/2008 | | |
| JP | 2009-205141 | 9/2009 | | |
| JP | 2009-205141 A | 9/2009 | | |
| KR | 10-2008-0027627 A | 3/2008 | | |
| KR | 10-2009-0101762 A | 9/2009 | | |
| KR | 1020090101762 | 9/2009 | | |
| WO | 2009-063847 | 5/2009 | | |
| WO | WO 2010021505 A2 * | 2/2010 | | C09J 133/08 |

OTHER PUBLICATIONS

JP 2003-177241 A, Takei, English machine translation provided by http://dossoer1.ipdl.inpit.go.jp/AIPN/odse_top_dn.ipdl?N0000=7400.*

Scherzer et al, UV Curing of pressure sensitive adhesives studied by real-time FTIR-ATR spectrscopy, 2002, Vibrational Spectroscopy, vol. 29, pp. 125-131.*

Scherzer ,Tom et al., "UV curing of pressure sensitive adhesives studied by real-time FTIR-ATR spectroscopy," Vibrational Spectroscopy 29 (2002) 125-13: Institut fur Oberflachenmodifizierung e.V., Permoserstr. 15, D-04318 Leipzig, Germany.

* cited by examiner

POLARIZING PLATE AND LIQUID CRYSTAL DISPLAY COMPRISING THE SAME

This application is a National Stage Entry of International Application No. PCT/KR2011/001403, filed Feb. 28, 2011, and claims the benefit of Korean Application Nos. 10-2010-0017668, filed on Feb. 26, 2010, and 10-2011-0018052, filed on Feb. 28, 2011, which are hereby incorporated by reference in their entirety for all purposes as if fully set forth herein.

TECHNICAL FIELD

The present invention relates to a polarizing plate and a liquid crystal display device.

BACKGROUND ART

A liquid crystal display (LCD) device is applied in various fields because it has low power consumption and can be formed in a thin plane.

The LCD device includes a liquid crystal panel including a liquid crystal present between transparent substrates and polarizing plates attached to both surfaces of the liquid crystal panel.

The polarizing plate generally has a structure shown in FIG. 1. That is, the polarizing plate 1 may include a polarizer 11, and protective films 12a and 12b attached to both surfaces of the polarizer 11. Also, the polarizing plate 1 may include a pressure-sensitive adhesive layer 13 formed under the protective film 12b and may be used to attach to a liquid crystal panel, and may further include a releasing film 14 formed under the pressure-sensitive adhesive layer 13. Although not shown in FIG. 1, the polarizing plate may include an additional functional film such as a reflection preventing film.

In such a structure of the conventional polarizing plate, to provide a device having a smaller thickness and light weight, for example, as described in patent reference No. 1, there have been attempts to form the polarizing plate while omitting one of the protective films 12a and 12b formed on both surfaces of the conventional polarizer 11. However, it is difficult to provide a polarizing plate with desired performance without using a protective film.

PRIOR ART REFERENCES

Patent References

[Patent Reference No. 1] JP Publication of patent application No. 2002-014226

DISCLOSURE

Technical Problem

The present invention is directed to a polarizing plate and a liquid crystal display device.

Technical Solution

The present invention relates to a polarizing plate including: a polarizer; and a pressure-sensitive adhesive layer attached to at least one surface of the polarizer that has a first surface and a second surface that have different peeling forces with respect to a non-alkali glass.

Hereinafter, the polarizing plate of the present invention will be described in further detail.

In one example, the pressure-sensitive adhesive layer may be a single layer structure having first and second surfaces. Here, the single layer structure means a structure in which the pressure-sensitive adhesive layer is a single-layered pressure-sensitive adhesive layer. Therefore, a pressure-sensitive adhesive layer having a structure in which at least two pressure-sensitive adhesive layers are stacked is excluded. In one example, a first surface of the pressure-sensitive adhesive layer may be attached to a polarizer, and a second surface thereof may be a pressure-sensitive adhesive surface for attaching the polarizing plate to a liquid crystal panel. Here, the first surface may have a lower peeling force with respect to the non-alkali glass than the second surface.

A kind of the polarizer included in the polarizing plate of the present invention is not particularly limited, and any common material known in the art, for example, a polyvinyl alcohol-based polarizer, may be employed without limitation.

A polarizer is a functional film or sheet capable of extracting light vibrating in only one direction from incident light vibrating in various directions. In a structure of a conventional polarizing plate, protective films such as triacetyl cellulose (TAC) films are generally attached to both surfaces of the polarizer. In the polarizing plate of the present invention, at least one of the above-mentioned protective films is omitted. That is, at least one surface of the polarizer does not have a protective film attached thereto, and the first surface of the pressure-sensitive adhesive layer may be attached to a surface of the polarizer which does not have a protective film. Furthermore, the pressure-sensitive adhesive layer may serve to attach the polarizing plate to a liquid crystal display panel.

FIG. 2 is a cross-sectional view of an exemplary polarizing plate 2 according to the present invention. As shown in FIG. 2, the polarizing plate 2 may include a polarizer 21; and a pressure-sensitive adhesive layer 22 formed on one surface of the polarizer 21. In FIG. 2, the protective film 23 is attached to a surface of the polarizer 21 which does not have the pressure-sensitive adhesive layer 22. However, the polarizing plate 2 of FIG. 2 is an example of the present invention, and for example, neither surface of the polarizer may have a protective film attached thereto in the present invention.

Since the polarizer is formed of a hydrophilic resin such as polyvinyl alcohol, it is generally vulnerable to moisture. Furthermore, since the polarizer is formed via a stretching process, it is easily contracted in moist conditions, resulting in degradation in the optical characteristics of the polarizing plate. For this reason, in the structure of the conventional polarizing plate, to reinforce strength of the polarizer, as shown in FIG. 1, protective films exemplified as TAC films are generally formed on both surfaces of the polarizer. When a protective film is not used, the polarizer has low dimensional stability, and durability or an optical property of the polarizing plate is degraded.

In the present invention, the above-mentioned problems can be resolved by forming a pressure-sensitive adhesive layer on the polarizer instead of a protective film. Here, the surfaces of the pressure-sensitive adhesive layer are designed to have different peeling forces with respect to a non-alkali glass. Due to the removal of the protective film, the present invention can provide a thinner and lighter polarizing plate, which may be referred to as a thin polarizing plate throughout the specification.

In other words, the polarizer does not have a protective film on at least one surface thereof, and a first surface of the pressure-sensitive adhesive layer, that is, a surface that has a relatively low peeling force, may be attached to a surface of the polarizer which does not have a protective film.

FIG. 3 illustrates a single-layered pressure-sensitive adhesive layer 10 having a first surface 10A and a second surface 10B.

When the first surface of the pressure-sensitive adhesive layer attached to the polarizer is designed to have a low peeling force with respect to a non-alkali glass, contraction or expansion of the polarizer under severe conditions including high temperature or high humidity may be inhibited. In addition, when the second surface 10B serving to attach the polarizing plate to a liquid crystal panel is designed to have a high peeling force, the polarizer may have excellent wettability to an adherent.

In one example, the first surface may have a peel strength to a non-alkali glass of 5 to 100 gf/25 mm, preferably, 5 to 70 gf/25 mm, more preferably, 10 to 70 gf/25 mm, and most preferably, 10 to 50 gf/25 mm. In addition, the second surface may have a peeling force to a non-alkali glass of 100 to 1,000 gf/25 mm, preferably 150 to 800 gf/25 mm, more preferably 150 to 70 gf/25 mm, and most preferably 250 to 750 gf/25 mm. The peeling force will be measured by a method described in the following example. When the peeling force of the first and second surfaces are controlled in the above-mentioned range, the contraction and expansion of the polarizer under high-temperature or high-humidity conditions may be effectively inhibited, and the polarizer may have excellent wettability to the liquid crystal panel.

The pressure-sensitive adhesive layer which is formed as a single layer structure and whose both surfaces have different peeling forces may be, for example, formed by making a modulus gradient in the direction of the thickness of the pressure-sensitive adhesive layer. Referring to FIG. 3, in one example, the pressure-sensitive adhesive layer 10 may have a tensile modulus gradient in a thickness direction from the first surface 10A to the second surface 10B (represented by arrow T of FIG. 3). The change in tensile modulus in the thickness direction means a continuous or discontinuous increase or decrease in the tensile modulus of the pressure-sensitive adhesive layer in the thickness direction. In detail, the tensile modulus may be changed in the thickness direction to show the highest tensile modulus on the first surface 10A, and the lowest tensile modulus on the second surface 10B.

To give such a change in the tensile modulus of the pressure-sensitive adhesive layer in the thickness direction, a method of controlling the degree of curing of the pressure-sensitive adhesive layer differently in the thickness direction may be used. For example, as described later, when the pressure-sensitive adhesive layer is formed using a UV curable pressure-sensitive adhesive composition, a pressure-sensitive adhesive layer whose storage modulus is changed in the thickness direction may be formed by suitably controlling the thickness of the coated pressure-sensitive adhesive composition and the intensity of UV rays irradiated during the curing of the composition. In other words, when the pressure-sensitive adhesive layer is formed by such a method, the irradiated UV rays penetrate in a thickness direction of the pressure-sensitive adhesive composition, and then are dissipated or absorbed by reaction with an internal photoinitiator. Here, as the dissipation or absorption of the UV rays is suitably adjusted, the intensity of the UV rays inducing the curing reaction is decreased downwards in the thickness direction of the pressure-sensitive adhesive composition, and therefore the degree of curing may be controlled differently in the thickness direction. In the present invention, in some cases, a pressure-sensitive adhesive layer whose degree of curing is changed in the thickness direction may be formed by a method of blending a UV absorber in a suitable amount with the photocurable pressure-sensitive adhesive composition. In other words, the UV absorber blended with the pressure-sensitive adhesive composition may absorb UV rays applied to the composition during the curing process, and thus a difference in the amount of UV radiation is made in the thickness direction, and thereby the degree of curing may be controlled differently.

When the pressure-sensitive adhesive layer is controlled for the tensile modulus to be changed in the thickness direction, the pressure-sensitive adhesive may have an average tensile modulus at 25° C. of 0.1 to 500 MPa, preferably 10 to 400 MPa, more preferably, 1 to 300 MPa, and most preferably, 45 to 300 MPa. When the average of the tensile modulus is controlled in the above range, the polarizing plate may effectively inhibit light leakage, and have excellent durability in high-temperature or high-humidity conditions. Meanwhile, the tensile modulus will be measured by the method described in the following example.

The thickness of the pressure-sensitive adhesive layer of the present invention is not particularly limited, but may be controlled in a range of 20 to 80 μm, and preferably 25 to 60 μm. When the pressure-sensitive adhesive layer has a thickness of less than 20 μm, the efficiency in inhibiting contraction or expansion of the polarizer may be decreased, or the efficiency in the implementation of the pressure-sensitive adhesive layers to have different degrees of curing in the thickness direction according to the above-described curing process may be degraded. When the pressure-sensitive adhesive layer has a thickness of more than 80 μm, it may be an obstacle to make the polarizing plate thin.

In the present invention, a method of forming the pressure-sensitive adhesive layer is not particularly limited. For example, the pressure-sensitive adhesive layer may be formed by curing with a conventional room temperature curable, moisture curable, thermal curable or photocurable pressure-sensitive adhesive composition, preferably a UV curable pressure-sensitive adhesive composition. The curing of the pressure-sensitive adhesive composition means expressing a pressure-sensitive adhesive characteristic in the pressure-sensitive adhesive composition by a physical action or chemical reaction by irradiating light, maintaining the pressure-sensitive adhesive composition at a predetermined temperature or supplying a suitable level of humidity.

In one example, the pressure-sensitive adhesive layer may include an interpenetrating polymer network (referred to as an "IPN"). The term "IPN" may indicate a state in which at least two kinds of crosslinking structures are present in a pressure-sensitive adhesive layer, and in one example, the crosslinking structure may be present in an entanglement, linking or penetrating state. When the pressure-sensitive adhesive layer includes the IPN, a polarizing plate with excellent durability, workability, optical characteristics and light leakage prevention in severe conditions can be realized.

When the pressure-sensitive adhesive layer has the IPN structure, the pressure-sensitive adhesive layer may include a crosslinking structure including an acryl polymer present in a crosslinked state and a crosslinking structure including a polymerized photopolymerizable compound.

For example, the acryl polymer may have a weight average molecular weight ($M_w$) of 500000 or more. The weight average molecular weight is a converted figure for standard polystyrene measured by gel permeation chromatography (GPC). Herein, unless specifically defined otherwise, the term "molecular weight" indicates a "weight average molecular weight." When the molecular weight of the polymer is designed at 500000 or more, it is possible to form a pressure-sensitive adhesive layer having excellent durability under a severe condition. The upper limit of the molecular weight is not particularly limited, and may be, for example, controlled in a range of 2500000 or less in consideration of the durability of the adhesive or coatability of the composition.

In one example, the polymer may include a (meth)acrylic acid ester monomer and a crosslinkable monomer as polymerization units.

As the (meth)acrylic acid ester monomer, alkyl(meth)acrylate may be used. In consideration of the control of cohesion, glass transition temperature and adhesion, alkyl(meth)acrylate including an alkyl group having 1 to 14 carbon atoms may be used. Examples of such monomers may include methyl (meth)acrylate, ethyl(meth)acrylate, n-propyl(meth)acrylate, isopropyl(meth)acrylate, n-butyl(meth)acrylate, t-butyl (meth)acrylate, sec-butyl(meth)acrylate, pentyl(meth)acrylate, 2-ethylhexyl(meth)acrylate, 2-ethylbutyl(meth)acrylate, n-octyl(meth)acrylate, isooctyl(meth)acrylate, isononyl (meth)acrylate, lauryl(meth)acrylate and tetradecyl(meth) acrylate, which may be used alone or in combination of at least two thereof.

As a crosslinkable monomer, any one including both a co-polymerizable functional group and a crosslinkable functional group in the molecule and capable of being copolymerized with the (meth)acrylic acid ester monomer and the monomer of Formula 1, and providing the crosslinkable functional group to the polymer after co-polymerization may be used without limitation.

Examples of the crosslinkable functional groups may include a hydroxyl group, a carboxyl group, a nitrogen-containing group such as an amino group, an isocyanate group and an epoxy group. In the art, various crosslinkable monomers capable of providing the above-mentioned crosslinkable functional group are known, and the monomers may all be used in the present invention. Examples of the crosslinkable monomers may include, but are not limited to, 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 2-hydroxyethyleneglycol(meth)acrylate, 2-hydroxypropyleneglycol(meth)acrylate, (meth)acrylic acid, 2-(meth)acryloyloxy acetic acid, 3-(meth)acryloyloxy propionic acid, 4-(meth)acryloyloxy butyric acid, an acrylic acid dimer, itaconic acid, maleic acid and maleic acid anhydride, (meth)acrylamide, N-vinyl pyrrolidone or N-vinyl caprolactame. One or at least two of such crosslinkable monomers may be included in the polymer.

The acryl polymer may include 80 to 99.8 parts by weight of (meth)acrylic acid ester monomer and 0.01 to 3 parts by weight of a crosslinkable monomer. Herein, unless specifically defined otherwise, the term "part(s) by weight" refers to a weight ratio.

When the weight ratio of the monomers of the acryl polymer is controlled as described above, a pressure-sensitive adhesive having excellent durability or optical properties may be provided.

The acryl polymer may further include a suitable co-monomer other than those described above.

For example, the polymer may further include a polymer of Formula 1 as a polymerization unit.

In Formula 1, R is hydrogen or an alkyl group, A is an alkylene group, $R_1$ is an alkyl or aryl group, and n is any one of 1 to 50.

The monomer of Formula 1 provides an alkyleneoxide group to the polymer. In one example, the alkyleneoxide group may be a linear, branched or cyclic alkyleneoxide group having 1 to 20, 1 to 16, 1 to 12, 1 to 8 or 1 to 4 carbon atoms. The alkyleneoxide group may allow the pressure-sensitive adhesive layer to exhibit a low haze and effectively inhibit light leakage when applied to the polarizing plate. The alkyleneoxide group may serve to maintain a peeling force at a proper level while the modulus of the pressure-sensitive adhesive layer is increased.

In Formula 1, R may be a hydrogen or an alkyl group having 1 to 4 carbon atoms, and be preferably hydrogen or a methyl group.

In Formula 1, A may be a substituted or unsubstituted alkylene group having 1 to 20, 1 to 16, 1 to 12, 1 to 8, or 1 to 4 carbon atoms, and the alkylene group may have a linear, branched or cyclic structure.

In Formula 1, when $R_1$ is an alkyl group, the alkyl group may also be a substituted or unsubstituted alkyl having 1 to 20, 1 to 16, 1 to 12, 1 to 8 or 1 to 4 carbon atoms, and the alky group may have a linear, branched or cyclic group.

In Formula 1, when $R_1$ is an aryl group, the aryl group may also have 6 to 20, 6 to 16, or 6 to 12 carbon atoms.

In Formula 1, n is preferably one of 1 to 25, more preferably, 1 to 15, and most preferably, 1 to 6.

Specific examples of the monomers of Formula 1 may include alkoxy alkyleneglycol(meth)acrylic acid ester, alkoxy dialkyleneglycol(meth)acrylic acid ester, alkoxy trialkyleneglycol(meth)acrylic acid ester, alkoxy tetraalkyleneglycol(meth)acrylic acid ester, alkoxy polyethyleneglycol (meth)acrylic acid ester, phenoxy alkyleneglycol(meth) acrylic acid ester, phenoxy dialkyleneglycol(meth)acrylic acid ester, phenoxy trialkyleneglycol(meth)acrylic acid ester, phenoxy tetraalkyleneglycol(meth)acrylic acid ester or phenoxy polyalkyleneglycol(meth)acrylic acid ester, and one or at least two of the monomers may be included in the polymer.

When the acryl polymer includes a monomer of Formula 2, the acryl polymer may include 40 to 99.9 parts by weight of a (meth)acrylic acid ester monomer, 10 to 50 parts by weight of a monomer of Formula 1, and 0.01 to 30 parts by weight of a crosslinkable monomer. Herein, unless specifically described otherwise, the term "part(s) by weight" refers to a weight ratio.

The polymer may further include a co-monomer of Formula 2 to control a glass transition temperature or provide other functionalities.

[Formula 1]

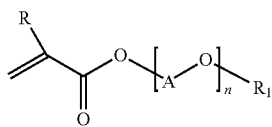

[Formula 2]

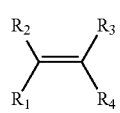

In Formula 2, $R_1$ and $R_3$ are each independently hydrogen or alkyl; R4 is cyano- or alkyl-substituted or unsubstituted phenyl, acetyloxy or COR$_5$. Here, R$_5$ is alkyl- or alkoxyalkyl-substituted or unsubstituted amino or glycidyloxy.

In the definitions of R$_1$ to R$_5$ of Formula 2, alkyl or alkoxy refers to alkyl or alkoxy having 1 to 8 carbon atoms, and preferably methyl, ethyl, methoxy, ethoxy, propoxy or butoxy.

Examples of the monomers of Formula 2 may include, but are not limited to, a nitrogen-containing monomer such as (meth)acrylonitrile, (meth)acrylamide, N-methyl(meth)acrylamide or N-butoxy methyl(meth)acrylamide; a styrene-based monomer such as styrene or methyl styrene; glycidyl (meth)acrylate; or a carboxylic acid vinyl ester such as vinyl acetate, and the monomer may be used alone or in combination of at least two thereof.

The acryl polymer may include the monomer of Formula 2 in an amount of 20 parts by weight or less.

The acryl polymer may be prepared by conventional polymerization methods known in the art. For example, the acryl polymer may be prepared by preparing a monomer mixture by suitably blending a (meth)acrylic acid ester monomer, a crosslinkable monomer and/or a monomer of Formula 1 in a desired weight ratio, and polymerizing the monomer mixture using a conventional method such as solution polymerization, photopolymerization, bulk polymerization, suspension polymerization or emulsion polymerization. In this process, when necessary, a suitable polymerization initiator or chain transfer agent may also be used.

The pressure-sensitive adhesive layer may further include a multifunctional crosslinking agent capable of crosslinking the acryl polymer, and the crosslinking agent may be, but is not limited to, a common crosslinking agent such as an isocyanate crosslinking agent, an epoxy crosslinking agent, an aziridine crosslinking agent, and a metal chelate crosslinking agent, and preferably an isocyanate crosslinking agent. The isocyanate crosslinking agent may be a multifunctional isocyanate compound such as tolylene diisocyanate, xylene diisocyanate, diphenylmethane diisocyanate, hexamethylene diisocyanate, isophoron diisocyanate, tetramethylxylene diisocyanate or naphthalene diisocyanate, or a compound obtained by reaction of the multifunctional isocyanate compound with a polyol compound such as trimethylol propane. The epoxy crosslinking agent may include, but is not limited to, at least one selected from the group consisting of ethyleneglycol diglycidylether, triglycidylether, trimethylolpropane triglycidylether, N,N,N',N'-tetraglycidyl ethylenediamine and glycerin diglycidylether. The aziridine crosslinking agent may include, but is not limited to, at least one selected from the group consisting of N,N'-toluene-2,4-bis(1-aziridinecarboxamide), N,N'-diphenylmethane-4,4'-bis(1-aziridinecarboxamide), triethylene melamine, bisisophthaloyl-1-(2-methylaziridine) and tri-1-aziridinyl phosphine oxide. In addition, the metal chelate crosslinking agent may be, but is not limited to, a compound in which a polyvalent metal such as aluminum, iron, zinc, tin, titanium, antimony, magnesium and/or vanadium is coordinated with acetyl acetone or ethyl acetoacetate.

In the pressure-sensitive adhesive, such a multifunctional crosslinking agent may be present in an amount of 0.01 to 10 parts by weight, and preferably 0.01 to 5 parts by weight with respect to 100 parts by weight of the above-mentioned acryl polymer. In such a range, the pressure-sensitive adhesive may maintain excellent cohesion or durability.

The multifunctional crosslinking agent may crosslink the polymer by reaction with a crosslinkable functional group of the acryl polymer during the formation of the pressure-sensitive adhesive layer, for example, an aging process.

The IPN-structured pressure-sensitive adhesive layer may include a crosslinking structure implemented by an acryl polymer crosslinked by the multifunctional crosslinking agent and a crosslinking structure by a polymerized photopolymerizable compound.

In other words, the pressure-sensitive adhesive composition may further include a photopolymerizable compound as a component to implement a different crosslinking structure from the crosslinking structure implemented by the crosslink of the acryl polymer. The term "photopolymerizable compound" refers to a compound including at least two photopolymerizable functional groups in the molecule to implement a crosslinking structure polymerized by the irradiation of light. The photopolymerizable functional group refers to a functional group polymerizable or crosslinkable by the irradiation of light. Examples of the photopolymerizable functional group may be, but is not limited to, a functional group including an ethylene unsaturated double bond such as an acryloyl or methacryloyl group. In addition, the term "irradiation of light" refers to irradiation of electromagnetic waves, which may be microwaves, IR rays, UV rays, X-rays, γ rays, or particle beams such as α-particle beams, proton beams, neutron beams, and electron beams.

The photopolymerizable compound may be a multifunctional acrylate (MFA).

A compound having at least two (meth)acryloyl groups in the molecule may be used as the multifunctional acrylate without limitation. Examples of the multifunctional acrylate to be used herein may include, but are not limited to: bifunctional acrylates such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, hydroxypivalic acid neopentylglycol di(meth)acrylate, dicyclopentanyl di(meth)acrylate, caprolactone-modified dicyclopentenyl di(meth)acrylate, ethyleneoxide-modified di(meth)acrylate, di(meth)acryloxy ethyl isocyanurate, allylated cyclohexyl di(meth)acrylate, tricyclodecane dimethanol(meth)acrylate, dimethylol dicyclopentane di(meth)acrylate, ethyleneoxide-modified hexahydrophthalic acid di(meth)acrylate, tricyclodecane dimethanol (meth)acrylate, neopentylglycol-modified trimethylpropane di(meth)acrylate, adamantane di(meth)acrylate, or 9,9-bis[4-(2-acryloyloxyethoxy)phenyl]fluorene; trifunctional acrylates such as trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri (meth)acrylate, trifunctional urethane(meth)acrylate, or tris (meth)acryloxyethylisocyanurate; tetrafunctional acrylates such as diglycerin tetra(meth)acrylate or pentaerythritol tetra (meth)acrylate; pentafunctional acrylates such as propionic acid-modified dipentaerythritol penta(meth)acrylate; and hexafunctional acrylates such as dipentaerythritol hexa(meth)acrylate, caprolactone-modified dipentaerythritol hexa (meth)acrylate, or urethane(meth)acrylate (e.g. a reaction product of an isocyanate monomer and trimethylolpropane tri(meth)acrylate). In some cases, a photocurable oligomer known in the art, for example, urethane acrylate, polycarbonate acrylate, polyester acrylate, polyether acrylate or epoxy acrylate, may be also used.

The multifunctional acrylate may be used alone or in combination of at least two thereof. It is preferable that the acrylate has a molecular weight of less than 1000 and at least trifunctional acrylate be used for durability, but the present invention is not limited thereto.

It is preferable that the multifunctional acrylate have a ring structure in the backbone structure. Due to the use of such an acrylate, the contraction or expansion of the polarizer may be effectively inhibited, and an effect of preventing light leakage may be improved. The ring structure included in the multifunctional acrylate may be any one of carbocyclic or heterocyclic, or monocyclic or polycyclic structures. Examples of the multifunctional acrylates including a ring structure may include, but are not limited to, hexafunctional acrylates such as a monomer having an isocyanurate structure (for example, tris(meth)acryloxy ethyl isocyanurate), and isocyanate-modified urethane(meth)acrylate (e.g., a reaction product of an isocyanate monomer and trimethylolpropane tri(meth)acrylate, etc.).

The multifunctional acrylate in the pressure-sensitive adhesive layer or the pressure-sensitive adhesive composition may be present in an amount of 20 to 200 parts by weight with respect to 100 parts by weight of the acryl polymer, and thus may more effectively control the tensile modulus of the pressure-sensitive adhesive layer and maintain excellent durability.

The pressure-sensitive adhesive layer may further include a UV absorber, which may improve the efficiency of forming a single-layered pressure-sensitive adhesive layer whose surfaces have different peeling forces as described above. That is, to cure a pressure-sensitive adhesive composition for the pressure-sensitive adhesive layer, it is necessary to perform the irradiation of light, for example, UV irradiation. For example, to form a sheet-type pressure-sensitive adhesive, a pressure-sensitive adhesive composition may be coated to a predetermined thickness, and UV rays irradiated to one surface of the coating layer. Here, the surface of the coating layer to which the UV rays are irradiated is sufficiently cured and thus has a high modulus, but as the UV rays are transmitted to the coating layer downward in a thickness direction, due to the UV absorber present in the coating layer, the UV rays are absorbed into the coating layer. Therefore, from the surface of the coating layer to which the UV rays are irradiated downward to the coating layer in the thickness direction, the amount of the absorbed UV rays decreases and the amount of UV rays reaching the lowermost coating layer is the lowest, and thus the degree of curing is also the lowest. As a result, in the sheet-type coating layer, a gradient in which the modulus is changed is made in the thickness direction. Here, the modulus refers to a tensile modulus or storage modulus. When the modulus of the sheet-type pressure-sensitive adhesive layer differs in the thickness direction, the surface of the coating layer having a high modulus, that is, to which UV rays are irradiated during curing, has a low peeling force; but the opposite surface thereof has a high peeling force.

Any UV absorber that does not affect the degradation of optical properties, modulus, repeelable characteristics, workability or peeling force may be used without limitation.

The UV absorber may be, but is not limited to, a benzotriazole compound such as a 2-(2'-hydroxyphenyl)-benzotriazole series compound, for example, 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2-hydroxy-5-(1,1,3,3, tetramethylbutyl)phenyl)benzotriazole, 2-(3',5'-di-tert-butyl-2'-hydroxyphenyl)-5-benzotriazole, 2-(3'-tert-butyl-2'-hydroxyphenyl-5'-methylphenyl)-5-benzotriazole, 2-(3'-sec-butyl-5'-tert-butyl-2'-hydroxyphenyl)benzotriazole, 2-(2'-hydroxy-4'-octyloxyphenylphenyl)-5-benzotriazole or 2-(3', 5'-di-tert-butyl-2'-hydroxyphenyl)benzotriazole; a benzophenone compound such as a 2-hydroxy benzophenone series compound having a 4-hydroxy, 4-methoxy, 4-octyloxy, 4-decyloxy, 4-dodecyloxy, 4-benzyloxy, 4,2',4'-trihydroxy or 2'-hydroxy-4,4'-dimethoxy functional group; a benzolic acid ester compound such as a compound having a substituted benzoic acid ester structure, for example, 4-tert-butyl-phenyl salicylate, phenyl salicylate, octylphenyl salicylate, dibenzoyl resorcinol, bis(4-tert-butyl-benzoyl)resorcinol, benzoyl resorcinol, 2,4-di-tert-butylphenyl-3,5'-di-tert-butyl-4-hydroxybenzoate, hexadecyl 3,5-di-tert-butyl-4-hydroxybenzoate, octadecyl 3,5-di-tert-butyl-4-hydroxybenzoate or 2-methyl-4,6-di-tert-butylphenyl 3,5-di-tert-butyl-4-hydroxybenzoate; or a triazine compound.

The UV absorber may be included in the pressure-sensitive adhesive composition in an amount of 10 parts by weight or less with respect to 100 parts by weight of the acryl polymer, or 0.1 to 10 parts by weight with respect to 100 parts by weight of the photopolymerizable compound, but the present invention is not limited thereto. The content of the UV absorber may be changed in consideration of the curing condition of the pressure-sensitive adhesive composition or a desired modulus or peeling force. However, when the content of the UV absorber is excessively increased, the amount of UV absorption of the coating solution is also increased, and thus it may be difficult to implement a pressure-sensitive adhesive layer in which the modulus differs in the thickness direction.

The pressure-sensitive adhesive composition may further include a radical initiator capable of effectively inducing a polymerization reaction of the photopolymerizable compound. In one example, the radical initiator may be a photoinitiator, which may be suitably selected in consideration of curing rate and yellowing possibilities. For example, as the photoinitiator, a benzoin-based, hydroxy ketone-based, amino ketone-based or phosphine oxide-based photoinitiator may be used. In detail, the photoinitiator may be benzoin, benzoin methylether, benzoin ethylether, benzoin isopropylether, benzoin n-butylether, benzoin isobutylether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexylphenylketone, 2-methyl-1-[4-(methylthio)phenyl]-2-morpholino-propane-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylantraquinone, 2-ethylantraquinone, 2-t-butylantraquinone, 2-aminoantraquinone, 2-methylthioxanthone, 2-ethylthioxanthone, 2-chlorothioxanthone, 2,4-dimethylthioxanthone, 2,4-diethylxanthone, benzodimethylketal, acetophenone dimethylketal, p-dimethylamino benzoic acid ester, oligo[2-hydroxy-2-methyl-1-[4-(1-methylvinyl)phenyl]propanone] and 2,4,6-trimethylbenzoyl-diphenyl-phosphineoxide, which may be used alone or in combination of at least two thereof.

The pressure-sensitive adhesive composition may include such a photoinitiator in an amount of 0.2 to 20 parts by weight, preferably, 0.2 to 10 parts by weight, and more preferably, 0.2 to 5 parts by weight with respect to 100 parts by weight of the acryl polymer. The photoinitiator may be present in an amount of 0.2 to 20 parts by weight of 100 parts by weight of the multifunctional acrylate. According to the above-mentioned amount, the reaction of the multifunctional acrylate may be effectively induced, and the degradation in the properties of the pressure-sensitive adhesive layer due to remaining components after curing may be prevented.

In addition, the pressure-sensitive adhesive layer may further include a silane coupling agent. The silane coupling agent serves to increase cohesion and adhesion stability of the pressure-sensitive adhesive, thereby improving heat and moisture resistance, and also improve adhesion reliability even when the pressure-sensitive adhesive is left for a long time under severe conditions. Examples of the silane coupling agents may include γ-glycidoxypropyl triethoxy silane, γ-glycidoxypropyl trimethoxy silane, γ-glycidoxypropyl methyldiethoxy silane, γ-glycidoxypropyl triethoxy silane, 3-mercaptopropyl trimethoxy silane, vinyltrimethoxy silane, vinyltriethoxy silane, γ-methacryloxypropyl trimethoxy silane, γ-methacryloxy propyl triethoxy silane, γ-aminopropyl trimethoxy silane, γ-aminopropyl triethoxy silane, 3-isocyanatopropyl triethoxy silane, γ-acetoacetatepropyl trimethoxysilane, γ-acetoacetatepropyl triethoxy silane, β-cyanoacetyl trimethoxy silane, β-cyanoacetyl triethoxy silane, and acetoxyacetotrimethoxy silane, which may be used alone or in combination of at least two thereof. The present invention may use, but is not limited to, a silane-based coupling agent having an acetoacetate group or β-cyanoacetyl group. In the pressure-sensitive adhesive layer, the silane coupling agent is present in an amount of 0.01 to 5 parts by weight, preferably, 0.01 to 1 parts by weight with respect to 100 parts by weight of the acryl polymer, and thus may effectively maintain adhesion and durability.

The pressure-sensitive adhesive layer may further include a tackifying resin. As the tackifying resin, a hydrocarbon-based resin or a hydrogenated product thereof, a rosin resin or a hydrogenated product thereof, a rosin ester resin or a hydrogenated product thereof, a terpene resin or a hydrogenated product thereof, a terpene phenol resin or a hydrogenated product thereof, a polymerized rosin resin or polymerized rosin ester resin may be used alone or in combination of at least two thereof. The tackifying resin may be present in an amount of 1 to 100 parts by weight with respect to 100 parts by weight of the acryl polymer.

In addition, the pressure-sensitive adhesive layer may further include at least one additive selected from the group consisting of an epoxy resin, a curing agent, a UV stabilizer, an antioxidant, a colorant, a reinforcing agent, a filler, an antifoaming agent, a surfactant, and a plasticizer without affecting the effects of the present invention.

A method of forming such a pressure-sensitive adhesive layer, which has the same components as described above and whose surfaces have different peeling force, is not particularly limited. For example, the pressure-sensitive adhesive layer may be formed by coating a pressure-sensitive adhesive composition including the above-mentioned components in a sheet shape, irradiating UV rays to one surface of the coated sheet-type coating layer, and curing the coating layer. Here, the irradiated UV rays may be absorbed into the coating layer in a thickness direction of the coating layer, thereby making a tensile modulus gradient in a thickness direction of the cured pressure-sensitive adhesive layer.

In other words, the adhesive may be prepared by coating a pressure-sensitive adhesive composition or a coating solution prepared of the same on a suitable processing substrate using conventional means such as a bar coater or a comma coater, and curing the processing substrate.

In this case, when the coated thickness of the pressure-sensitive adhesive composition and the degree of irradiation of the UV rays are controlled, or when necessary, a UV absorber is included in the composition, the irradiated UV rays may be absorbed during the penetration in the thickness direction of the coating layer, thereby making the gradient of modulus.

FIG. 4 is a schematic diagram illustrating a method of preparing an exemplary pressure-sensitive adhesive. Referring to FIG. 4, a pressure-sensitive adhesive may be prepared by irradiating UV rays to the coating layer 10 of the pressure-sensitive adhesive composition. Here, the irradiation of the UV rays may be performed on one surface of the coating layer 10 formed of the pressure-sensitive adhesive composition between two releasing films 20. The irradiated UV rays are absorbed in a certain ratio during the propagation in the thickness direction of the coating layer 10. Therefore, the surface 10A to which the UV rays are directly irradiated is sufficiently cured, and has a high modulus and a low peeling force. However, the other surface 10B is relatively less cured, and thus has a low modulus and a high peeling force.

A desired pressure-sensitive adhesive may be effectively prepared using the above-mentioned pressure-sensitive adhesive composition of the present invention, and, when necessary, by adjusting the kind or content of the UV absorber which may be included in the composition, the thickness of the coating layer 10 (see FIG. 2), or the wavelength or intensity of the irradiated UV rays.

Meanwhile, the irradiation of the UV rays may be performed using a known means such as a high pressure mercury lamp, an electrodeless lamp, or a xenon lamp. In addition, conditions for irradiating UV rays are not particularly limited, and thus may be suitably selected in consideration of the composition of the pressure-sensitive adhesive composition. Therefore, a cured material changed in a tensile modulus in a thickness direction may be effectively prepared. In this case, illuminance is approximately 50 to 2000 mW/cm$^2$, and amount of light is approximately 10 to 1000 mJ/cm$^2$, but the present invention is not limited thereto.

The method of the present invention may further include a heating, drying or aging process, other than the UV irradiating process, considering the curing efficiency of the pressure-sensitive adhesive composition or to form an IPN structure.

When the IPN structure is implemented, the pressure-sensitive adhesive may have a gel content of 80 wt % or more, and preferably 90 wt % or more, as represented by Equation 1.

$$\text{Gel Content (wt \%)} = B/A \times 100 \quad \text{[Equation 1]}$$

In Equation 1, A is a mass of the pressure-sensitive adhesive having the IPN structure, and B is a dry mass of an insoluble component of the pressure-sensitive adhesive layer obtained after the same pressure-sensitive adhesive is deposited in ethyl acetate at room temperature for 48 hours.

When the gel content is less than 80 wt %, the durability of the pressure-sensitive adhesive may be decreased in high-temperature and/or high-humidity conditions.

In the present invention, the upper limit of the gel content is not particularly limited, but may be suitably controlled in a range of 99% or less in consideration of stress relaxation characteristics of the pressure-sensitive adhesive.

In one example, the pressure-sensitive adhesive layer may be attached to the polarizer by means of an adhesive layer. In one example, the polarizing plate may further include an adhesive layer directly attached to a surface of the polarizer, specifically, a surface on which a protective film is not formed, and the pressure-sensitive adhesive layer may be directly attached to the adhesive layer. In the present invention, the term "B directly attached to A" means that there is no layer between A and B.

The adhesive layer may be any of a polyvinyl alcohol-based adhesive; an acryl-based adhesive; a vinyl acetate-based adhesive; a urethane-based adhesive; a polyester-based adhesive; a polyolefin-based adhesive; a polyvinyl alkylether-based adhesive; a rubber-based adhesive; a vinylchloride-vinylacetate-based adhesive; a styrene-butadiene-styrene (SBS) adhesive; a hydrogenated styrene-butadiene-styrene (SEBS)-based adhesive; an ethylene-based adhesive; and an acrylic acid ester-based adhesive, which are used alone or in combination of at least two thereof. The adhesive layer may be, for example, formed using a water-based, solvent-based, or non-solvent-based adhesive composition. The adhesive composition may also be a thermocurable, room temperature curable, moisture curable or photocurable adhesive composition. In the present invention, the adhesive layer is preferably formed using a photocurable adhesive composition, and more preferably a UV curable adhesive composition, but the present invention is not limited thereto. Examples of the adhesive layers may include a water-based polyvinyl alcohol-based adhesive, a non-solvent acryl-based adhesive, and a non-solvent vinyl acetate-based adhesive.

A method of forming the above-mentioned adhesive layer on a polarizer is not particularly limited, and may, for example, include coating an adhesive composition on a polarizer, laminating the pressure-sensitive adhesive layer, and curing the coated adhesive composition.

The adhesive layer may have a thickness of 10 to 600 nm, preferably 15 to 500 nm, and more preferably 15 to 450 nm. When the thickness of the adhesive layer is controlled at 10 nm or more, the polarizing plate may maintain excellent water resistance, and when the thickness of the adhesive layer is controlled at 600 nm or less, it is possible to form a uniform adhesive layer.

The polarizing plate of the present invention may further include a protective film attached to a surface of the polarizer, specifically, the surface opposite to that to which the pressure-sensitive adhesive layer is attached. Examples of the protective film may include, but are not limited to, a cellulose-based film such as a TAC film; a polyester-based film such as a poly(ethylene terephthalate) film (PET film); a polycarbonate-based film; a polyethersulfone-based film; and an acryl-based film; and/or a polyolefin-based film such as polyethylene film, a polypropylene film, a polyolefin film having a cyclo or norbornene structure or an ethylene-propylene copolymer film. The protective film may be, for example, attached to the polarizer by means of the above-mentioned adhesive layer.

In addition, the polarizing plate may further include a releasing film attached to a bottom of the pressure-sensitive adhesive layer. A conventional component in the art may be employed as the releasing film.

When necessary, the polarizing plate may further include at least one functional layer selected from the group consisting of an anti-reflection layer, an anti-glare layer, a retardation plate, a wide viewing angle compensating film and a brightness enhancing film.

The present invention relates to a liquid crystal display device including a liquid crystal panel and a polarizing plate according to the present invention attached to one or both surfaces of the liquid crystal panel.

The kind of the liquid crystal panel included in the LCD device is not particularly limited. For example, all kinds of known panels including, but is not particularly limited to, a passive matrix panel such as a twisted nematic (TN), super twisted nematic (STN), ferroelectric (F) or polymer dispersed (PD) panel; an active matrix panel such as a two-terminal or three-terminal panel; an in-plane switching (IPS) panel; and a vertical alignment (VA) panel may be used.

The kind of other components comprising the LCD device, for example, upper and lower substrates (e.g., a color filter substrate or an array substrate), are not particularly limited either, and any components known in the art may be employed without limitation.

Advantageous Effects

According to the present invention, a polarizing plate which has a lighter weight and a thinner thickness, and also has excellent physical properties such as durability, water resistance, workability, adhesion and light leakage prevention effect; and a liquid crystal display device including the same can be provided.

MODE FOR INVENTION

Hereinafter, the present invention will be described with reference to examples and comparative examples in detail. However, the present invention is not limited to these examples.

Preparation Example 1

Preparation of Acryl Polymer 98 parts by weight of n-butyl acrylate (n-BA) and 2 parts by weight of 2-hydroxyethyl acrylate (2-HEA) were put into a 1 L reactor equipped with a cooling device to reflux nitrogen gas and facilitate temperature control. Subsequently, 180 parts by weight of ethyl acetate (EAc) was put into the reactor as a solvent, which was purged with the nitrogen gas for 60 minutes to remove oxygen. Afterwards, the temperature was maintained at 67° C., 0.05 parts by weight of azobisisobutyronitrile (AIBN), as a reaction initiator, was put thereinto, and the reaction was carried out for 8 hours. After the reaction, the reaction product was diluted with ethyl acetate, and thus an acryl polymer (A) having a solid concentration of 30 wt %, a weight average molecular weight of 1000000 and a molecular weight distribution of 4.9 was prepared.

Example 1

Formation of Pressure-Sensitive Adhesive Layer

Figure 1:
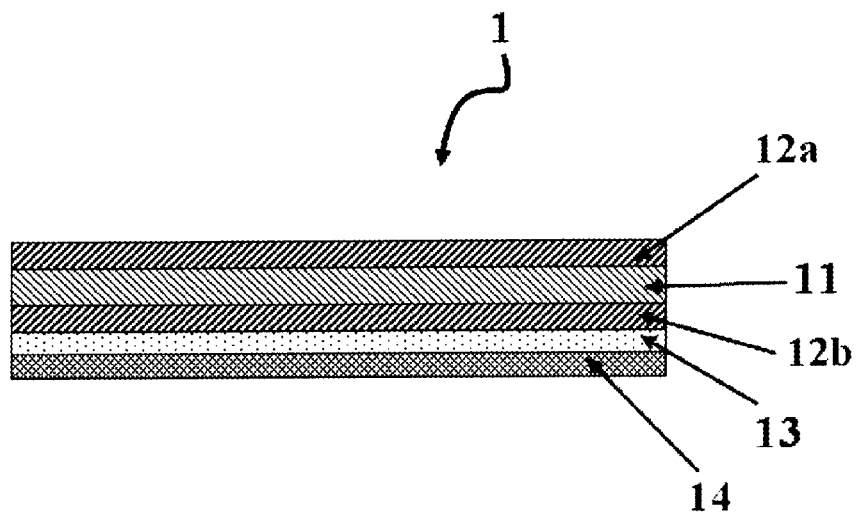
FIG. 1 is a schematic cross-sectional view of a conventional polarizing plate.
Figure 2:
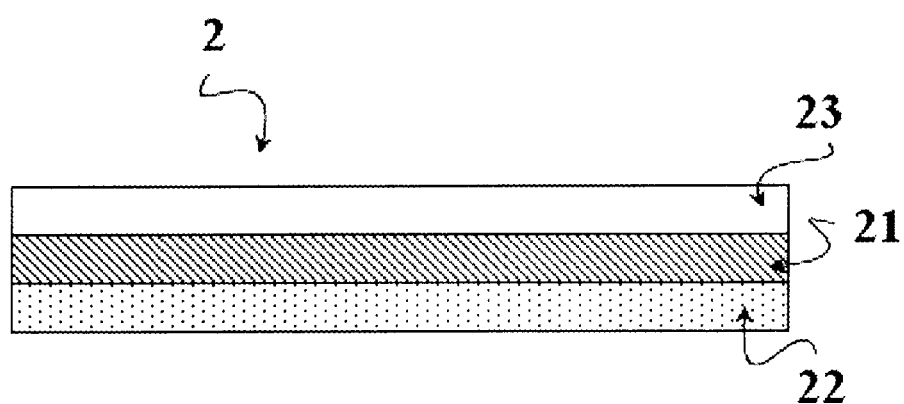
FIG. 2 is a cross-sectional view of an exemplary polarizing plate according to the present invention.
Figure 3:
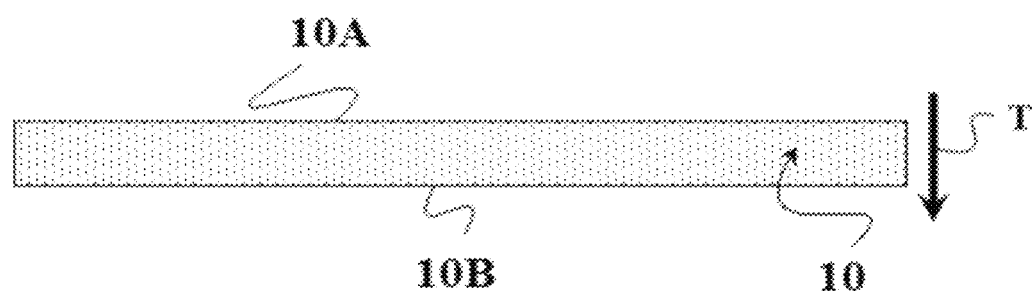
FIG. 3 is a cross-sectional view of a pressure-sensitive adhesive according to the present invention.
Figure 4:
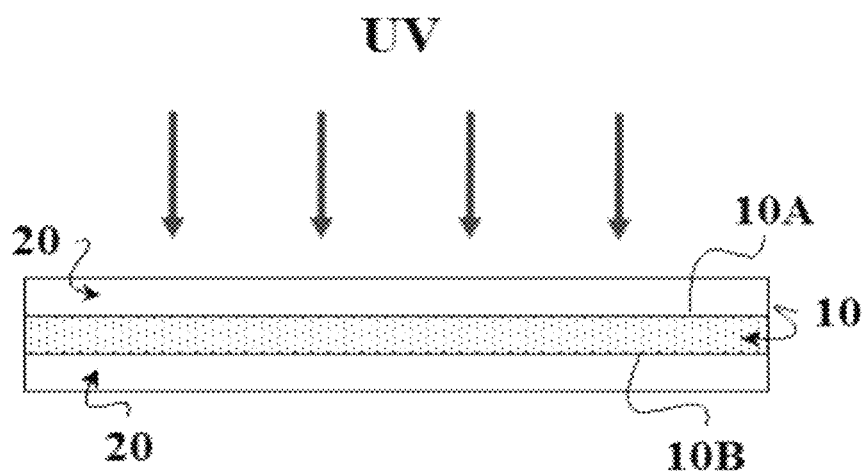
FIG. 4 illustrates a process of preparing a pressure-sensitive adhesive according to the present invention.

A pressure-sensitive adhesive composition was prepared by blending 100 parts by weight of an acryl polymer (A), 3 parts by weight of a multifunctional crosslinking agent (TDI-based Isocyanate, Coronate L, Nippon Polyurethane Industry (Japan)), 100 parts by weight of a multifunctional acrylate (trifunctional urethane acrylate, Aronix M-315, Dongwoo Corporation), 3 parts by weight of a photoinitiator (Irg 184, hydroxycyclohexylphenylketone, Ciba Specialty Chemical (Switzerland)), 3 parts by weight of triazine-based UV absorber (Tinuvin 400, Ciba Specialty Chemical (Switzerland)) and 0.1 parts by weight of a silane coupling agent having β-cyanoacetyl group (M812, LG Chemical (Korea)) in a solvent to have a solid concentration of 30 wt %. Subsequently, the prepared pressure-sensitive adhesive composition was coated on a releasing treated surface of a PET film (thickness: 38 μm, MRF-38, Mitsubishi) subjected to releasing treatment to have a predetermined thickness after drying, and the resulting film was dried in an oven at 110° C. for 3 minutes. Then, a releasing-treated surface of the releasing-treated PET film (thickness: 38 μm, MRF-38, Mitsubishi) was further laminated on the dried coating layer, thereby forming a stacked structure, shown in FIG. 4, and UV rays were irradiated using a high pressure mercury lamp, thereby forming a pressure-sensitive adhesive layer 10 between two PET releasing films 20. Hereinafter, for convenience of the description, a surface of the pressure-sensitive adhesive layer 10 to which UV rays were irradiated is referred to as a first surface 10A, and the other surface thereof is referred to as a second surface 10B.

<Condition for UV Irradiation>
Illuminance: 250 mW/cm$^2$
Amount of Light: 300 mJ/cm$^2$
Formation of Polarizing Plate A polarizer was formed by stretching a polyvinyl alcohol-based resin film, staining the film with iodine, and treating the resulting film with a boric acid aqueous solution. Subsequently, a 60 μm-thick triacetyl cellulose (TAC) film was attached to one surface of the polarizer using a water-based polyvinyl alcohol-based adhesive. Afterwards, the first surface of the pressure-sensitive adhesive layer was laminated to a surface of the polyvinyl alcohol-based polarizer to which a TAC film was not attached using the same water-based polyvinyl alcohol-based adhesive as used above, thereby forming a polarizing plate.

Examples 2 to 4 and Comparative Examples 1 to 4

Except that components of the pressure-sensitive adhesive compositions were changed as shown in Table 1, a polarizing plate was formed by the same method as described in Example 1.

TABLE 1

|  | Examples | | | | Comparative Examples | | | |
| --- | --- | --- | --- | --- | --- | --- | --- | --- |
|  | 1 | 2 | 3 | 4 | 1 | 2 | 3 | 4 |
| Acryl Polymer | 100 | 100 | 100 | 100 | 100 | 100 | 100 | 100 |
| Crosslinking Agent | 3 | 3 | 3 | 3 | 3 | 3 | 3 | 3 |
| MFA | 100 | 120 | 150 | 120 | 120 | 120 | 120 | — |
| Photoinitiator | 3 | 3 | 3 | 3 | 3 | 3 | 3 | — |
| UV Absorber | 3 | 2 | 3 | 3 | 0.1 | 10 | 3 | — |
| Silane Coupling Agent | 0.1 | 0.1 | 0.1 | 0.1 | 0.1 | 0.1 | 0.1 | 0.1 |
| Thickness (μm) | 40 | 40 | 40 | 60 | 40 | 40 | 15 | 40 |

Content Unit: Part(s) by Weight
MFA: 3-functional Urethane Acrylate (Aronix M-315, Dongwoo Corporation)
Crosslinking Agent: TDI-based Isocyanate Crosslinking Agent (Coronate L, Nippon Polyurethane Industry)
Photoinitiator: Irg 184: Hydroxycyclohexylphenyl Ketone (Ciba Specialty Chemical, Switzerland)
UV Absorber: Triazine-based UV Absorber (Tinuvin 400, Ciba Specialty Chemical, Switzerland)
Silane Coupling Agent: M812: β-cyanoacetyl-Containing Silane Coupling Agent (LG Chemical)

<Evaluation of Physical Properties>
1. Evaluation of Tensile Modulus

Herein, the tensile modulus of the pressure-sensitive adhesive layer was measured by a tensile stress-strain test according to a method defined in ASTM D638, or when it was difficult to directly measure the tensile modulus, a storage modulus was measured by the following method and then converted by the following formula. Specifically, a stacked structure formed in the structure shown in FIG. 4 (including a PET releasing film, a pressure-sensitive adhesive layer and a PET releasing film) was cut into a dog bone-type specimen in a size of 7 cm (length)×1 cm (width). Both ends of the specimen were fixed with tensile test jigs, and a tensile modulus was measured. The conditions for measuring the tensile modulus were as follows.

<Conditions for Measuring Tensile Modulus>
Measuring Apparatus: Universal Test Machine (UTM)
Equipment Model: Zwick Roell Z010, Instron
Measurement Conditions:
Load Cell: 500 N
Tensile Speed: 3 mm/sec <Measurement of Storage Modulus and Conversion into Tensile Modulus>

A pressure-sensitive adhesive layer was cut in a size of 15 cm×25 cm×25 μm (width×length×thickness), and 5 pressure-sensitive adhesive layers cut as described above were stacked. Subsequently, the stacked pressure-sensitive adhesive layers were cut in a circle having a diameter of 8 mm, and pressed using glasses overnight to improve a wetting property at an interface between layers, thereby removing air bubbles generated during stacking. As a result, a specimen was prepared. Subsequently, the specimen was placed on a parallel plate, and a gap was adjusted. Then, a zero point of Normal & Torque was adjusted, the stability of a normal force was checked, the storage modulus was measured under the following conditions, and the tensile modulus was calculated according to the following conversion formula.

Measurement Apparatus and Measuring Conditions
Measurement Apparatus: ARES-RDA, TA Instruments Inc. with forced convection oven
Measuring Conditions:
Geometry: 8 mm parallel plate
Gap: around 1 mm
Test Type: dynamic strain frequency sweep
Strain=10.0 [%], temperature: 30° C.
Initial Frequency: 0.4 rad/s, final frequency: 100 rad/s <Conversion Formula>

$$E = 3G$$

In the above formula, E is a tensile modulus, and G is a storage modulus.

2. Evaluation of Peeling Force and Repeelable Characteristic

Using a pressure-sensitive adhesive layer formed in Example or Comparative Example, a polarizing plate was formed in the same method as described in Example 1. Here, the polarizing plate was formed by changing the direction of the pressure-sensitive adhesive layer according to the surface of the pressure-sensitive adhesive layer subject to measure its peeling force. In other words, when the peeling force of a first surface was measured in the process of forming a polarizing plate described in Example 1, a second surface was attached to a polarizer, and when the peeling force of the second surface was measured, the first surface was attached to the polarizer. Afterwards, a polarizing plate was cut to a size of 25 mm×100 mm (width×length), and thus a specimen was prepared. Subsequently, a PET releasing film attached onto the pressure-sensitive adhesive layer was peeled from the specimen, and the surface of the pressure-sensitive adhesive layer was attached to a non-alkali glass using a 2 kg roller according to the instruction of JIS Z 0237. Then, the resulting non-alkali glass to which the pressure-sensitive adhesive layer was attached was pressed in an autoclave (50° C., 0.5 pressure) for approximately 20 minutes, and stored at a constant temperature and humidity (23° C., 50% relative humidity) for 25 hours. Then, while the polarizing plate was peeled from the non-alkali glass using a texture analyzer (TA) apparatus (Stable Microsystem (UK)) at a peel rate of 300 mm/min and a peel angle of 180 degrees, peeling force was measured. Furthermore, the repeelable characteristic was evaluated according to the following criteria.

<Criteria for Evaluation of Repeelable Characteristic>
◯: peeling force of 800 N/25 mm or less was measured one day after the attachment
Δ: peeling force of 1,000 N/25 mm or more was measured one day after the attachment
x: peeling force of 2,000 N/25 mm or more was measured one day after the attachment 3. Evaluation of Durability The polarizing plates formed in Examples and Comparative Examples were cut to a size of 90 mm×170 mm (width× length), thereby preparing two specimens for each Example or Comparative Example. Subsequently, the two prepared specimens were attached to both surfaces of a glass substrate (110 mm×190 mm×0.7 mm=width×length×thickness). However, the specimens were attached with their optical absorbance axes crossing each other, thereby forming the sample. A pressure applied to the substrate during the attachment was approximately 5 kg/cm$^2$, and works were performed in a clean room to avoid the generation of air bubbles or foreign materials to interfaces. The durability against humidity and heat resistance of the sample was determined by observing whether air bubbles were generated or peeling occurred on the pressure-sensitive adhesive interface after the sample was maintained for 1000 hours under conditions of a temperature of 60° C. and a relative humidity of 90%. Furthermore, the durability against heat resistance was determined by observing whether air bubbles or peeling was generated on the pressure-sensitive adhesive interface after the sample was maintained for 1000 hours at a temperature of 80° C. Samples prepared just before the durability against humidity and heat resistance or heat resistance was measured, were left for 24 hours at room temperature, and then evaluated. Evaluation conditions were as follows.

<Criteria for Evaluation of Durability>
◯: No air bubbles or peeling were generated.
Δ: Air bubbles and/or peeling were somewhat generated.
x: Air bubbles and/or peeling were considerably generated.

4. Evaluation of Water Resistance

Polarizing plates formed in Examples and Comparative Examples were cut to a size of 90 mm×170 mm (width× length), thereby forming specimens. Each specimen was attached to one surface of a glass substrate (110 mm×190 mm×0.7 mm=width×length×thickness), thereby forming a sample. A pressure applied during the attachment was approximately 5 kg/cm$^2$, and works were performed in a clean room to avoid the generation of air bubbles or foreign materials to interfaces. Subsequently, the formed sample was put into water at 60° C., kept for 24 hours, and then taken out to observe whether air bubbles or peeling were generated. Thereby, the water resistance was evaluated according to the following criteria.

<Criteria for Evaluation of Water Resistance>
◯: No air bubbles and peeling were generated.
Δ: Air bubbles and/or peeling were somewhat generated.
x: Air bubbles and/or peeling were considerably generated.

5. Evaluation of Uniformity in Light Transmission

The polarizing plates formed in Examples and Comparative Examples were attached to a 22-inch LCD monitor (LG Philips LCD) in a state in which their optical absorption axes crossed each other, stored for 24 hours under a constant temperature and humidity (23° C., 50% relative humidity) condition, and left at 80° C. for 200 hours. Afterwards, light was irradiated to the monitor using a back light in a dark room, and the uniformity in light transmission was evaluated according to the following criteria.

<Criteria for Evaluation of Uniformity in Light Transmission>
◉: Non-uniformity in light transmission was not visualized at four peripheral parts of the monitor
◯: Non-uniformity in light transmission was slightly visualized at four peripheral parts of the monitor
Δ: Non-uniformity in light transmission was somewhat visualized at four peripheral parts of the monitor
x: Non-uniformity in light transmission was considerably visualized at four peripheral parts of the monitor 6. Evaluation for Weight Average Molecular Weight and Molecular Weight Distribution The weight average molecular weight and the molecular weight distribution of an acryl polymer were measured using a GPC under the following conditions. To draw a calibration curve, standard polystyrene of an Agilent system was used, and measurement results were converted.

<Conditions for Measuring Weight Average Molecular Weight>
Measuring Apparatus: Agilent GPC (Agilent 1200 series, USA)
Column: two connected PL mixed B
Column Temperature: 40° C.
Eluent: Tetrahydrofuran
Flow Rate: 1.0 mL/min
Concentration: ~2 mg/mL (100 μL injection)

The measurement results are summarized and shown in Table 2.

TABLE 2

|  | Examples | | | | Comparative Examples | | | |
| --- | --- | --- | --- | --- | --- | --- | --- | --- |
|  | 1 | 2 | 3 | 4 | 1 | 2 | 3 | 4 |
| Tensile Modulus (23° C., MPa) | 90 | 200 | 160 | 70 | 300 | 0.09 | 150 | 0.06 |
| Peeling force (First Surface) (gf/25 mm) | 30 | 15 | 20 | 35 | 15 | 350 | 20 | 500 |
| Peeling force (Second Surface) (gf/25 mm) | 600 | 350 | 450 | 650 | 30 | 400 | 40 | 550 |
| Repeelability | ◯ | ◯ | ◯ | ◯ | ◯ | Δ | ◯ | Δ |
| Durability against Heat Resistance | ◯ | ◯ | ◯ | ◯ | X | X | X | X |
| Durability against Humidity and Heat Resistance | ◯ | ◯ | ◯ | ◯ | X | Δ | Δ | X |
| Water Resistance | ◯ | ◯ | ◯ | ◯ | X | X | Δ | X |
| Uniformity in Light Transmission | ◯ | ◯ | ◯ | ◯ | Δ | ◯ | ◯ | ◯ |

DESCRIPTION OF REFERENCES 1, 2: a polarizing plate
10, 13, 22: a pressure sensitive adhesive layer
11, 21: a polarizer
12a, 12b, 23: a protect film
10A: a first surface
10B: a second surface
20: a releasing PET film

The invention claimed is:

1. A polarizing plate, comprising:
   a polarizer;
   an adhesive layer directly attached to at least one surface of the polarizer; and
   an acrylic pressure-sensitive adhesive layer comprising:
   a first surface that is attached to a surface of the polarizer via the adhesive layer, on which a protective film is not attached, and that has a peeling force ranging from 5 to 50 gf/25 mm with respect to a non-alkali glass, and
   a second surface that is a pressure-sensitive adhesive surface for attaching the polarizing plate to a liquid crystal panel that has a peeling force of 150 to 1000 gf/25 mm with respect to the non-alkali glass, and wherein the pressure-sensitive adhesive layer is a single layer having the first and second surfaces.

2. The polarizing plate according to claim 1, wherein the polarizer is a polyvinyl alcohol-based polarizer.

3. The polarizing plate according to claim 1, wherein the pressure-sensitive adhesive layer has a tensile modulus gradient in a thickness direction from the first surface to the second surface.

4. The polarizing plate according to claim 3, wherein the pressure-sensitive adhesive layer has an average tensile modulus at 23° C. of 0.1 to 500 MPa.

5. The polarizing plate according to claim 1, wherein the pressure-sensitive adhesive layer includes a crosslinking structure having an acryl polymer present in a crosslinked state and a crosslinking structure having a polymerized photopolymerizable compound.

6. The polarizing plate according to claim 5, wherein the pressure-sensitive adhesive layer includes a UV absorber.

7. A liquid crystal display device, comprising:
   a liquid crystal panel; and
   a polarizing plate according to claim 1 attached to one or both surfaces of the liquid crystal panel.

8. The liquid crystal display device according to claim 7, wherein the liquid crystal panel is a passive matrix panel, an active matrix panel, an in-plane switching panel or a vertical alignment panel.

* * * * *